J. STURROCK.
JOURNAL BEARING.
APPLICATION FILED FEB. 2, 1914.
1,219,187.
Patented Mar. 13, 1917.
2 SHEETS—SHEET 1.
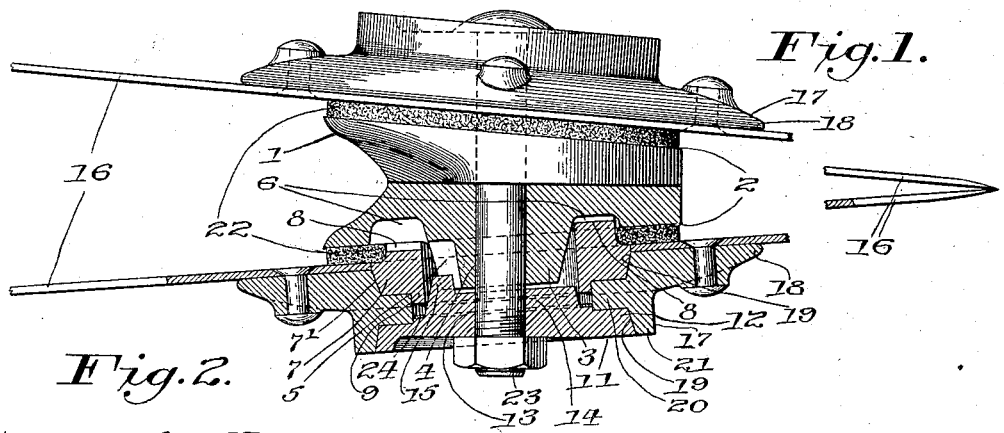
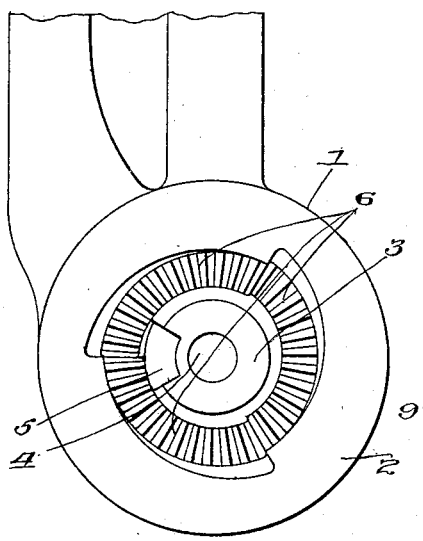
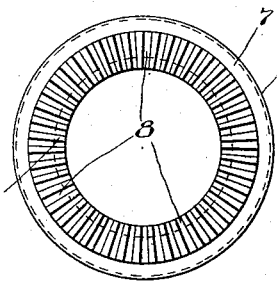
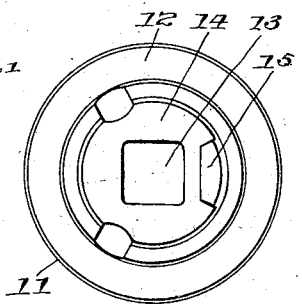
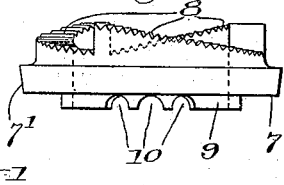
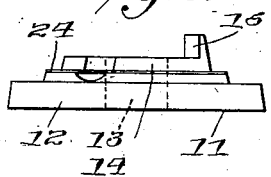
Witnesses:
C. C. Palmer.
F. W. Hoffmeister.
Inventor.
John Sturrock,
By Chas. E. Lord
Atty.

J. STURROCK.
JOURNAL BEARING.
APPLICATION FILED FEB. 2, 1914.

1,219,187.

Patented Mar. 13, 1917.
2 SHEETS—SHEET 2.

Witnesses:
C. C. Palmer
F. W. Hoffmeister

Inventor.
John Sturrock,
By Chas. E. Lord
Atty.

UNITED STATES PATENT OFFICE.

JOHN STURROCK, OF CHICAGO, ILLINOIS, ASSIGNOR TO INTERNATIONAL HARVESTER COMPANY OF NEW JERSEY, A CORPORATION OF NEW JERSEY.

JOURNAL-BEARING.

1,219,187.           Specification of Letters Patent.      Patented Mar. 13, 1917.

Application filed February 2, 1914. Serial No. 816,012.

*To all whom it may concern:*

Be it known that I, JOHN STURROCK, a subject of the King of Great Britain, residing at Chicago, in the county of Cook and State of Illinois have invented certain new and useful Improvements in Journal-Bearings, of which the following is a full, clear and exact specification.

My invention relates to journal bearings in general, and is designed in particular for use in connection with rotatable disks, being adapted to use either in connection with single disks or furrow openers for grain drills, wherein two rotatable disks are mounted upon a supporting member in a manner to rotate in substantially vertical planes at an angle with the line of draft of the machine; the disks converging forward when two disks are used with their front edges in close contact with each other.

The object of my invention is to improve the construction of such devices, facilitate the assemblage of the various parts in proper operative position, and readjust the same in an improved manner to compensate for wear under usage. I attain these objects by means of mechanism, two embodiments of which are illustrated by the accompanying drawings, in which—

Figure 1 is a top plan view, partly in section, of a double disk supporting member having my improved journal bearing embodied in its construction;

Fig. 2 is a vertical side elevation of part of the disk supporting member;

Fig. 3 is a bottom view of Fig. 2;

Fig. 4 is a plan view of one of the bearing blocks;

Fig. 5 is a side elevation of the blocks shown in Fig. 4.

Fig. 6 is a plan view of the other coacting bearing block;

Fig. 7 is a side elevation of the block shown in Fig. 6;

Figure 8:
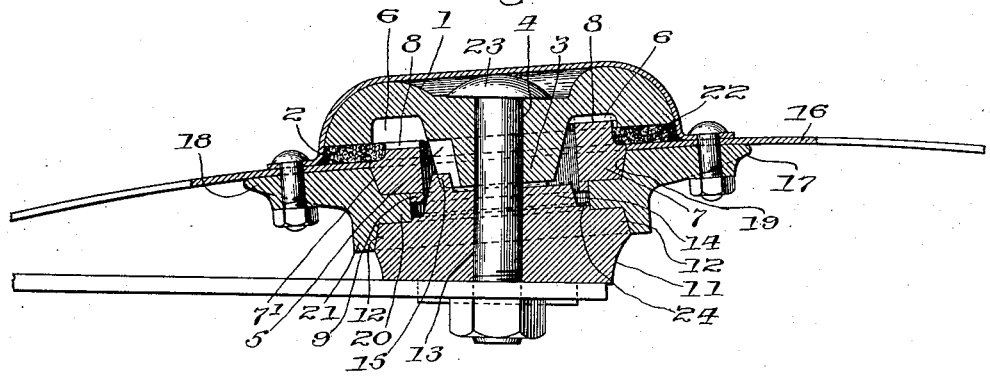
Fig. 8 is a cross section of the mechanism designed for use in connection with a single disk furrow.

Referring to the drawings, 1 represents a disk supporting member provided with forwardly converging bearing faces 2 upon opposite sides of its lower end and laterally extending boss members 3 having an axial opening 4 extending therethrough and peripherally disposed notches 5, the bosses being surrounded by a series of concentric radially corrugated cam faces 6 of ratchet form.

7 represents a cylindrical bearing block having peripheral bearing surfaces $7^1$ and provided upon one side with radially corrugated concentric cam faces 8 corresponding to the cam faces 6. As shown in section in Fig. 1, each of these blocks is provided with an axial opening that receives the boss member 3, and the opposite side of the block (Fig. 5) is provided with a laterally extending concentric rim 9 having a series of radially disposed lubricant conducting channels 10 therein. 11 represents a complemental bearing block of substantially the same diameter as the blocks 7 and provided with a laterally disposed concentric rim 12 and an axial bolt receiving opening 13. Extending laterally from the inner side of the rim 12 is a boss or positioning member 14 having a laterally extending lip member 15 at one side thereof that, in the assemblage of the parts, is received by the peripheral notch 5 in the boss member 3 in a manner to lock the members against independent rotation.

16 represents a furrow opening disk and 17 a cup-shaped casing having a flange member 18 whereby it is secured to the disk. This casing 17 is provided with a bearing surface 19 journaled upon the bearing surface $7^1$ on the member 7, and an inwardly extending annular flange member 20 journaled upon the rim 9, and a laterally extending rim member 21 that receives the bearing block 11, likewise provided with a bearing surface 19. 22 represents a dust excluding felt washer interposed between the disk and the adjacent face of the supporting member 1, the inner end of the block 7 preferably being reduced in diameter and having the same fitting snugly thereover. The bearing block members 11 and the coacting disks are secured to the member 1 in operative relation by means of a bolt 23, and adjusting washers 24 may be placed between the block members 7 and 11 to regulate the space required by the annular flange member 20 for a free rotation of the disk.

Figure 9:
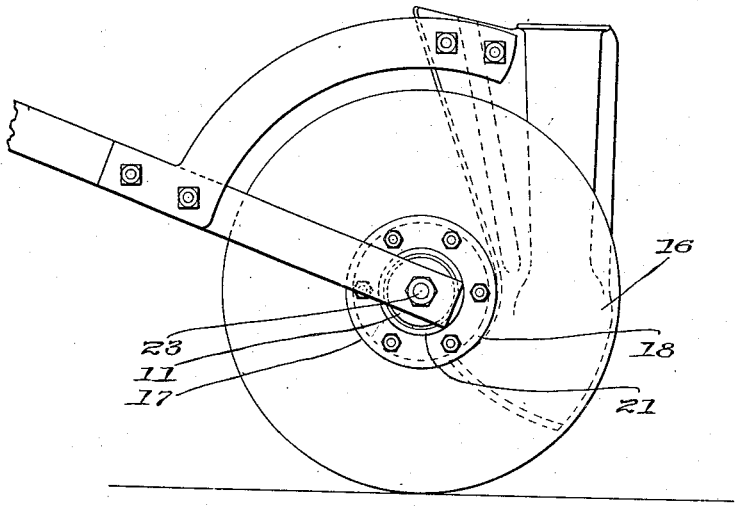
Fig. 9 is a side elevation of the mechanism shown in Fig. 8.

The single disk form of the construction shown in Figs. 8 and 9 is obviously of substantially the same construction as that hereinabove described and will operate in substantially the same way, the principal difference being that the positioning member and support are in inverted relation.

In assembling of the various parts of the mechanism it is important in a double disk mechanism that the front converging sides of the disks be brought in close contact with each other, and in a single disk mechanism that the disk rotates in close proximity with the grain boot and scraper. Heretofore it has been necessary to have the parts of accurate dimensions and closeness, smooth and regular in form, the result being that a large number of pieces were rejected under the most rigid inspection. With my invention the disks are adjustable bodily by means of the opposing cam surfaces on the bearing block, the bearing block being adjustable angularly in either direction, whereby the disks may be adjusted toward or from each other when two are used, and may be adjusted toward or from the boot where a single disk is used, the corrugations upon the opposing cam surfaces effectually retaining the parts in adjusted relation.

While I have specifically described but one form which my invention may assume in practice, it is, of course, to be understood that the form shown for purposes of illustration may be modified without departing from the spirit of my invention.

What I claim as my invention and desire to secure by Letters Patent is:

1. In a journal bearing, a rotatable member, a support, a series of concentric face cams upon said support, a bearing block between said support and rotatable member, a corresponding series of face cams upon said bearing block engaging with the face cams upon said support, and means for securing said parts in operative relation.

2. In a journal bearing, a rotatable member, a support, a series of concentric face cams upon said support, said cams having radial corrugations, a bearing block between said support and rotatable member, a corresponding series of face cams upon said bearing block adapted to interlock with the face cams upon said support, and means for securing said parts in operative relation.

3. In a journal bearing, a pair of rotatable members, a support having forwardly converging surfaces upon opposite sides thereof, a series of concentric face cams upon the converging surfaces of said support, bearing blocks between said support and rotatable member, a corresponding series of face cams upon said bearing blocks, means for securing said parts in operative relation, and means for adjusting said blocks to change the relative positions of the rotatable members on the support.

4. In a journal bearing, a support having a notched boss protruding therefrom and an annular groove surrounding the base of said boss, an annular bearing block seated in said groove, a coaxially disposed positioning member spaced apart from said block having a lug extending into the notch in said boss, a rotating element journaled between said positioning member and said bearing block, and means for holding the parts in assembled relation.

5. In a journal bearing, a support having an annular groove thereon, an annular bearing block carried in said groove, a coaxially arranged positioning member spaced apart from said bearing block, means for locking said positioning member against rotation with respect to said support, a rotating element having an inner peripheral flange rotatably mounted in the interval between said block and positioning member, and means for adjusting the interval between said positioning member and said support.

6. In a journal bearing, a support having an annular groove therein and a boss encircled thereby and protruding laterally therefrom, said boss having a notch therein, a bearing block seated in said groove, adjustable means for locking said bearing block and support against rotation, a positioning member adjacent the end of said boss having a lug protruding into the notch therein, and means for holding the parts in assembled relation.

7. In a journal bearing, a support having a boss protruding therefrom and an annular groove surrounding said boss provided with ratchet faces on its bottom, a coöperating bearing block seated in said groove and having coöperating ratchet surfaces on its inner face, a coaxially disposed positioning member spaced apart from said block, means locking said positioning member against angular movement with respect to said support, a rotating element overlapping the adjacent edges of said bearing block and said positioning member, and means holding the parts in assembled relation.

8. In a journal bearing, a support having a boss protruding therefrom and an annular groove surrounding said boss and provided with ratchet faces on its bottom, a coöperating bearing block seated in said groove and having coöperating ratchet surfaces on its inner face, a coaxially disposed positioning member spaced apart from said block, means locking said positioning member against angular movement with respect to said support, a rotating element overlapping the adjacent edges of said bearing block and said positioning member having an inner peripheral flange freely rotatable between adjacent walls of said members, and means holding the parts in assembled relation.

9. In a journal bearing, a support having an annular groove therein and a boss protruding laterally therefrom encircled by said groove, an annular bearing block carried in said groove, a coaxially disposed positioning member carried adjacent the end of said boss and spaced apart from said bearing block, annular flanges on the adjacent walls of said bearing block and positioning member, and a rotating member having an inner peripheral flange rotatably mounted between said bearing block and positioning member with its inner periphery in engagement with the flanges on said members.

10. In a journal bearing, a support having an annular groove therein and a notched boss protruding laterally from the center thereof, a bearing block carried in said groove, means for locking said bearing block against independent rotation with respect to said support, a positioning member coaxially disposed with respect to said boss having a lug engaging a notch therein, said positioning member being spaced apart from said bearing block, means for adjusting at will the interval between said bearing block and positioning member, an element rotatable in the interval between said members upon bearings formed by said members, and means for clamping together said bearing block and positioning member holding the several parts in assembled relation.

11. In a journal bearing, a support having an annular groove therein and a notched laterally protruding boss having its base encircled by said groove, an annular bearing block carried in said groove, adjustable means for locking said block against rotation with respect to said support, a positioning member coaxially disposed with respect to said block engaging said notched boss, said member being spaced apart from said block and locked against rotation with respect to said support, means for adjusting the interval between said bearing block and said positioning member, a rotating element journaled between the adjacent walls of said bearing block and said support, dust excluding means between said rotating element and said support, and means for adjusting the interval between said support and positioning member.

12. In a journal bearing, a support having an annular groove therein provided with ratchet faces on its bottom, an annular bearing block seated in said groove having an annular flange on its outer edge, a coaxially located positioning member spaced apart therefrom having a corresponding flange thereon, a rotatable member having an inner peripheral flange rotatable between said positioning member and said bearing block having its inner edge in engagement with the walls of the flanges on said members, means for adjusting the interval between said bearing block and positioning member, dust excluding means carried between said rotating member and said support, and means for adjusting the relative positions of said positioning member, rotating element and bearing block in an axial direction.

13. In a device of the character described, two rotatable members, a support therefor, and bearing blocks carried between said members and support and rotatably adjustable relative to said support to change the positions of said members on the support.

14. In a device of the character described, a pair of rotatable members, a support therefor, and means carried coaxially with said members and rotatable with respect to said support for adjusting said rotatable members toward and from each other on said support.

15. In a device of the character described, a rotatable member, a support therefor, a block on which said member rotates carried by the support, said block being rotatably adjustable with respect to said support to move the rotatable member in and out relative to the support.

16. In a device of the character described, a pair of rotatable members, a support between them, hub members on said rotatable members having annular flanges, bearing blocks between the flanges and supporting members, positioning members coacting with said bearing blocks and flanges, and an axially arranged clamping member extending through said positioning members and support.

17. In a device of the character described, a pair of rotatable members, a support between them, hub members on said rotatable members having annular flanges, bearing blocks between the flanges and supporting members, positioning members coacting with said bearing blocks and flanges, yielding packing material between the support and each of the rotatable members, and an axially arranged clamping member extending through said positioning members and support.

18. In a device of the character described, a rotatable member, a support therefor, a bearing member for said rotatable member adjustable toward or from said support, means whereby said bearing member is held in each position of adjustment, a coöperating bearing member for said rotatable member, and means for clamping said bearing members to said support.

19. In a device of the character described, a rotatable member, a support therefor, a bearing member for said rotatable member adjustable toward or from said support, means whereby said bearing member is held in each position of adjustment, a coöperating bearing member for said rotatable member, and a single bolt clamping said elements together.

20. In a device of the character described, a rotatable member, a support therefor, a bearing member for said rotatable member adjustable toward or from said support, means whereby said bearing member is held in each position of adjustment, a coöperating bearing member for said rotatable member, means intermediate said last mentioned bearing member and support for preventing relative rotation, and means for clamping the parts together.

21. In a device of the character described, a rotatable element having a flange, a support therefor, an axially adjustable bearing member carried on said support having a bearing surface engaging said flange, means for holding said bearing member in each position of adjustment, a coöperating bearing member having a bearing surface engaging said flange, means for preventing relative rotation between said coöperating bearing member and support, and means for clamping the parts together.

In testimony whereof I affix my signature in the presence of two witnesses.

JOHN STURROCK.

Witnesses:
  FERDINAND HACKER,
  C. G. BURNS.

Copies of this patent may be obtained for five cents each, by addressing the "Commissioner of Patents, Washington, D. C."